Patented June 20, 1933

1,914,549

UNITED STATES PATENT OFFICE

HAROLD EDWARD WOODWARD, OF PENNS GROVE, NEW JERSEY, ASSIGNOR TO E. I. DU PONT DE NEMOURS & COMPANY, OF WILMINGTON, DELAWARE, A CORPORATION OF DELAWARE

AZO DYESTUFFS AND THEIR PRODUCTION

No Drawing.   Application filed December 4, 1931.   Serial No. 579,194.

This invention relates to the production of chemical compounds, and more particularly to azo dyes containing no sulphonic or carboxylic groups.

The invention has as an object the production of new chemical compounds, new disazo dyes valuable for coloring organic liquids and solids, particularly hydrocarbons and halogenated hydrocarbons, and in general an advancement of the art. Other objects of the invention will be apparent by reference to the following description thereof.

These objects are accomplished by producing compounds having the following probable general formula:

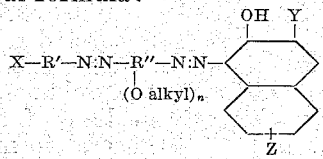

in which R' represents an aromatic radical of the benzene or naphthalene series containing no sulphonic or carboxylic groups, R'' represents an aromatic radical of the benzene or naphthalene series with the azo groups para to each other and containing no sulphonic or carboxylic groups.

X is one or more members of the group consisting of -alkyl, -O-alkyl, -CH$_2$N(alkyl)$_2$, -OC$_2$H$_4$N(alkyl)$_2$, and may be -H if R' is a naphthyl residue, Y is a member of the group consisting of -H, -CON(alkyl)$_2$, -CONH(alkyl), $$-CON<^{alkyl}_{aryl},$$

and -CON= wherein the two valence bonds of the nitrogen are part of a heterocyclic ring, Z is a group which may be —H or —NH$_2$, $n$ is 1 or 2 and may be zero if R'' is a naphthyl residue.

Compounds of the type above described are obtained by diazotizing an aromatic amine of the benzene or naphthalene series having no carboxylic or sulphonic groups and containing as substituents one or more members of the group consisting of -alkyl, -O-alkyl, -CH$_2$N(alkyl)$_2$, -OC$_2$H$_4$N(alkyl)$_2$ and -H, and coupling the resultant product with an amino compound of the benzene or naphthalene series capable of coupling in the position para to the amino group, having no sulphonic or carboxylic groups, and containing as substituents one or two alkoxy groups unless the amino compound employed is a naphthalene derivative in which case the alkoxy groups are not essential. The resulting amino-azo compound is further diazotized and coupled with a naphthol containing as a substituent a member of the group consisting of -H, -CON(alkyl)$_2$, -CONH(alkyl), $$-CON<^{alkyl}_{aryl},$$

and -CON= wherein the two valence bonds of the nitrogen are part of a heterocyclic ring.

While the invention is susceptible of considerable variation and modification in the manner of its practical application, particularly as regards the various products obtained and conditions of temperature, proportions of material, etc., involved in their preparation, the following examples will illustrate some of the products falling within the invention and how they may be prepared. The proportions are given in parts by weight.

*Example 1.*—The amino-azo-hydrochloride prepared from 123 parts of para-anisidine diazotized and coupled with 143 parts of alpha-naphthylamine is stirred with 6000 parts of water and diazotized with 55 parts of hydrochloric acid (100%) and 76 parts of sodium nitrite for one hour at 10° C. The brown diazo solution is filtered and run into a solution of 152 parts of beta-naphthol, 44 parts of sodium hydroxide and 106 parts of sodium carbonate in 2000 parts of water at 5° C. When the coupling is complete the color is filtered at 60° C., washed with water and dried at 60° C. The product is a black powder insoluble in water, but soluble in acetone, chloroform, carbon tetrachloride, ethylene dichloride, ethylene dibromide, gasoline, kerosene, benzene, toluene, chlorobenzene, nitrobenzene, and alpha-chloro-naphthalene with a bluish-red color. The maximum absorption of light in its gasoline solution is at about 545 millimicrons.

Its constitution may be represented by the following formula:

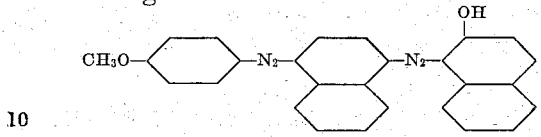

*Example 2.*—The amino-azo-hydrochloride prepared from 137 parts of para-phenetidine diazotized and coupled with 173 parts of 1-amino-2-naphthol-methyl-ether is stirred with 6000 parts of water and diazotized with 55 parts of hydrochloric acid (100%) and 76 parts of sodium nitrite for one hour at 10° C. The brown diazo solution is filtered and run into a solution of 152 parts of beta-naphthol, 44 parts of sodium hydroxide and 106 parts of sodium carbonate in 2000 parts of water at 5° C. When the coupling is complete the insoluble color is filtered off at 60° C., washed and dried. The product is a black powder, soluble in benzol, gasoline and many other organic liquids with a blue-violet color. The maximum absorption of light in its gasoline solution is at about 580 millimicrons.

Its constitution may be represented by the following formula:

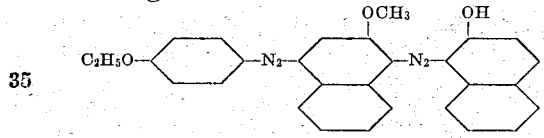

*Example 3.*—The amino-azo-hydrochloride prepared from 153 parts of amino-hydroquinone-dimethyl-ether, diazotized and coupled with 173 parts of 1-amino-2-naphthol-methyl-ether is stirred with 5000 parts of water and 55 parts of hydrochloric acid (100%) and diazotized by adding 76 parts of sodium nitrite and stirring for one hour at 10° C. The diazo chloride is soluble and is filtered into a solution of 227 parts of 2-hydroxy-3-ethyl-naphthamide and 80 parts of sodium hydroxide in 800 parts of alcohol (95%) and 1000 parts of water at 5–10° C. After the coupling is complete the insoluble color is filtered off at 80° C., washed and dried. The product is a black powder, insoluble in water, but soluble in benzene, gasoline and other organic liquids with a blue color. The maximum absorption of light in its gasoline solution is at about 595 millimicrons.

The following formula represents its constitution:

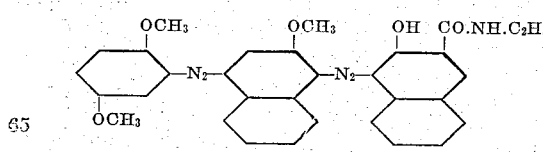

*Example 4.*—The amino-azo-hydrochloride prepared from 143 parts of alpha-naphthylamine, diazotized and coupled with 173 parts of 1-amino-2-naphthol-methyl-ether is stirred with 10,000 parts of water and 55 parts of hydrochloric acid (100%). It is then diazotized with 76 parts of sodium nitrite at 10° C. for two hours. The insoluble diazo compound is added to a solution of 227 parts of 2-hydroxy-3-ethyl-naphthamide and 80 parts of sodium hydroxide in 800 parts of alcohol (95%) and 1000 parts of water at 5–10° C. After the coupling is complete the color is filtered off at 50° C. washed and dried. The product is a black powder soluble in benzene and other organic solvents with a green color. The maximum absorption of light in its gasoline solution is at about 600 millimicrons.

Its constitution may be represented by the following structural formula:

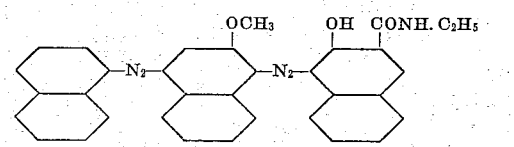

It will be understood that the above examples are not intended to limit the scope of the invention. As previously indicated the methods of preparation may be varied widely, particularly as regards such details as the proportions of the reacting substances and conditions of temperature, volumes, and the like. Any other intermediate of the character described in the general formula, and different combinations of those used in the examples may be employed.

First components which are preferably employed are para-anisidine, para-phenetidine, amino-hydroquinone-dimethyl-ether, alpha-naphthylamine, 4-amino-pyrocatechol-dimethyl-ether, symmetrical amino-pyrogallol-trimethyl-ether, para-amino-benzyl-dimethyl-aniline, omega-dimethyl-amino-para-phenetidine, and beta-naphthylamine.

Second components which give especially desirable results are alpha-naphthylamine, 1-amino-2-naphthol-methyl-ether, cresidine, amino-hydroquinone-ether, and 1-amino-7-naphthol.

As last components, beta-naphthol, 1-amino-7-naphthol, 2-hydroxy-3-naphthoyl piperidide, 2-hydroxy-3-naphthoyl-cyclohexylamide, alkyl and alkyl-aryl derivatives of 2-hydroxy-3-naphthamide are preferred.

For purposes of interpretation, the nomenclature used in the specification and claims may be defined as follows. An alkyl group is an acyclic radical derived from a hydrocarbon by the elimination of one atom of hydrogen. An alkoxy radical, which is also written O-alkyl, is an acyclic oxy-alkyl radical such as, for example, $-OCH_3$, $-OC_2H_5$, and the like. An aryl group is an iso-cyclic radical of the benzene, diphenyl, or naphthalene series which may or may not be saturated.

Compounds of the type herein described are especially well adapted to coloring organic liquids and solids, particularly gasoline and other hydrocarbons and halogenated hydrocarbons. In general, about 5–20 milligrams of dye per liter of organic liquid gives a pleasing depth of color.

As many apparent and widely different embodiments of this invention may be made without departing from the spirit and scope thereof, it is to be understood that I do not limit myself to the specific embodiments thereof except as defined by the appended claims.

I claim:

1. A chemical compound having the probable formula:

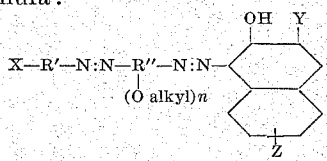

in which R' represents an aromatic radical of the benzene or naphthalene series containing no sulphonic or carboxylic groups, R'' represents an aromatic radical of the benzene or nahthalene series with the azo groups para to each other and containing no sulphonic or carboxylic groups, X is one or more members of the group consisting of -alkyl, -O-alkyl, -$CH_2N(alkyl)_2$, -$OC_2H_4N(alkyl)_2$, and may be -H if R' is a naphthyl residue, Y is a member of the group consisting of -H, -$CON(alkyl)_2$, -CONH(alkyl), $$-CON<{alkyl \atop aryl,}$$

and -CON= wherein the two valence bonds of the nitrogen are part of a heterocyclic ring, Z is a group which may be -H or -$NH_2$, and $n$ is 1 or 2 and may be zero if R'' is a naphthyl residue.

2. The chemical compound set forth in claim 1 wherein R' is an aromatic radical of the benzene series containing no sulphonic or carboxylic groups.

3. The chemical compound set forth in claim 1 wherein X is one or more alkoxy groups.

4. The chemical compound set forth in claim 1 wherein R'' is a naphthalene derivative with the azo groups para to each other and containing no sulphonic or carboxylic groups.

5. A chemical compound having the general formula set forth in claim 1, wherein R' is an aromatic radical of the benzene series containing no sulphonic or carboxylic groups, R'' is a naphthalene radical with the azo groups para to each other and containing no sulphonic or carboxylic groups, X is one or more methoxy radicals, Y is a member of the group consisting of -H, -$CON(alkyl)_2$, -CONH(alkyl), and $$-CON<{alkyl \atop aryl,}$$

Z is -H and $n$ is 1.

6. A chemical compound having the formula:

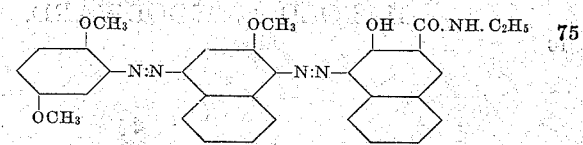

7. The process of preparing an azo dye compound which comprises diazotizing alpha-naphthylamine, coupling the resultant product with 1-amino-2-naphthol-methyl-ether, diazotizing the resultant amino-azo compound and coupling with 2-hydroxy-3-ethyl-naphthamide.

8. The process of preparing an azo dye compound which comprises diazotizing an aromatic amine of the benzene or naphthalene series having no carboxylic or sulphonic groups and containing as substituents one or more members of the group consisting of -alkyl, -O-alkyl, $CH_2N(alkyl)_2$, -$OC_2H_4N(alkyl)_2$, and -H, coupling the resultant product with an amino compound of the benzene or naphthalene series capable of coupling para to the amino group, containing as a substituent one or more O-alkyl groups and having no sulphonic or carboxylic groups, diazotizing the resulting amino-azo compound and coupling with a naphthol containing as a substituent a member of the group consisting of -H, -$CON(alkyl)_2$, -CONH(alkyl), $$-CON<{alkyl \atop aryl,}$$

and -CON= wherein the two valence bonds of the nitrogen are part of a heterocyclic ring.

9. The process of preparing an azo dye which comprises diazotizing para-phenetidine, coupling the resulting product with 1-amino-2-naphthol-methyl-ether, diazotizing the resultant amino-azo compound and coupling it with beta-naphthol.

10. The process of preparing an azo dye which comprises diazotizing amino-hydroquinone-dimethyl-ether, coupling the resultant product with 1-amino-2-naphthol-methyl-ether, diazotizing the resultant amino-azo compound and coupling it with 2-hydroxy-3-ethyl-naphthamide.

11. An azo dye having the following probable formula:

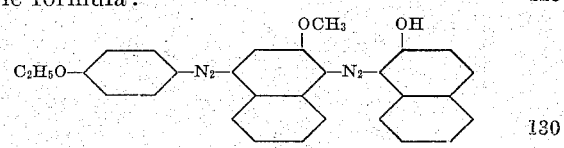

12. An azo dye having the folowing probable formula:
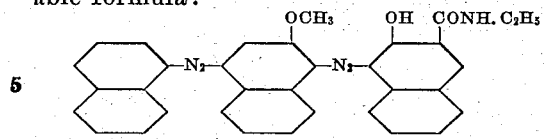
In testimony whereof I affix my signature.
HAROLD E. WOODWARD.